July 17, 1956 W. R. EDDY 2,754,841
RELIEF VALVE
Filed Oct. 23, 1951
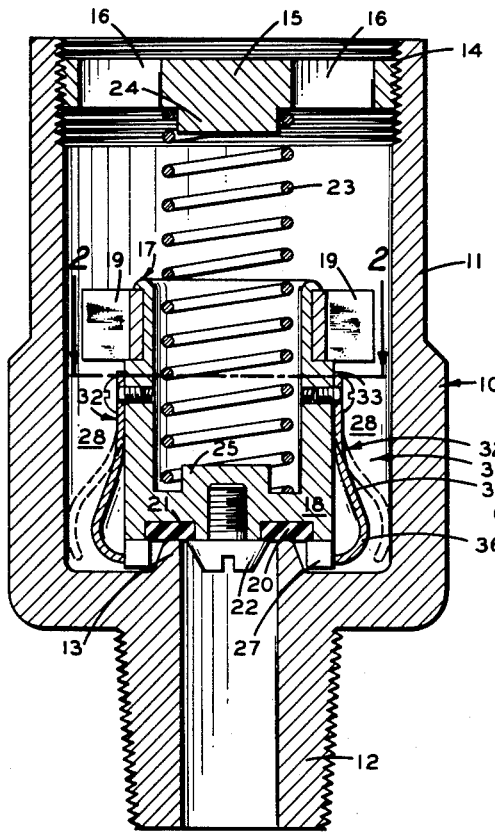
FIG. 1
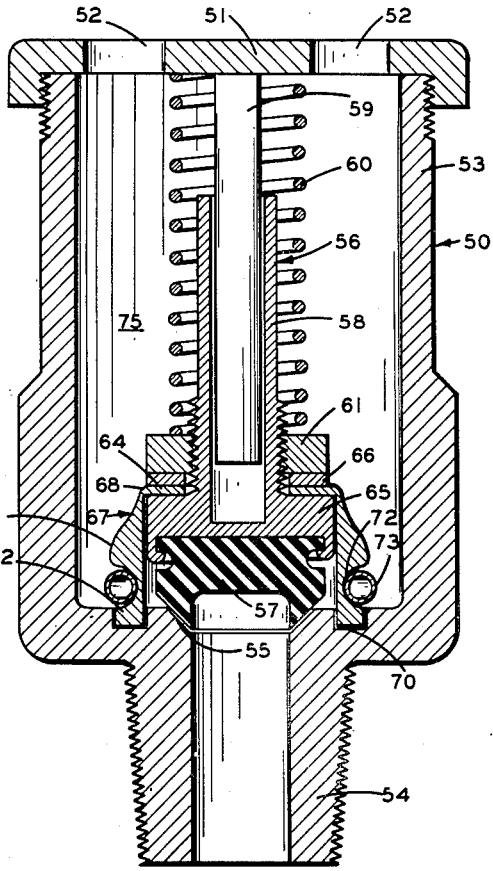
FIG. 4
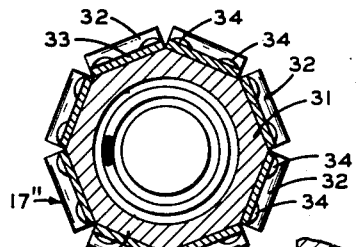
FIG. 2
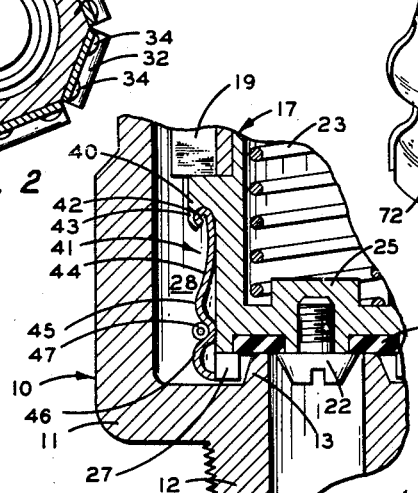
FIG. 3
FIG. 5
INVENTOR.
W. R. EDDY
BY Hudson and Young
ATTORNEYS

United States Patent Office 2,754,841
Patented July 17, 1956

2,754,841

RELIEF VALVE

William R. Eddy, Bartlesville, Okla., assignor to Phillips Petroleum Company, a corporation of Delaware Application October 23, 1951, Serial No. 252,607

12 Claims. (Cl. 137—469)

This invention relates to relief valves.

In relief valves, considerable difficulty is experienced in obtaining proper opening and reseating. In such valves, a valve head is urged into engagement with a valve seat by a spring, the valve opening or "popping" when the pressure in the valve seat is sufficient as to overcome the force exerted by the spring upon the valve head. Upon opening of the valve, the gases pass through the opening between the head and seat to a passageway leading to the atmosphere or to a suitable vent, the passageway being defined by the valve body and the valve head.

It is an object of this invention to improve the opening and reseating characteristics of such valves by providing auxiliary valve opening members in said passageway which are responsive to the pressure of the escaping gases and facilitate the opening movement of the valve.

It is a further object to provide collapsible members of the type just mentioned which move back out of the passageway when the gas flow decreases, thereby facilitating reseating of the valve.

It is a still further object to provide a relief valve having the desired characteristics which is simple in construction, reliable in operation, and easy to manufacture.

Various other objects, advantages and features of the invention will become apparent from the following detailed description taken in conjunction with the accompanying drawings, in which:

Figure 1 is a vertical sectional view of a relief valve constructed in accordance with the invention;

Figure 2 is a sectional view taken along the lines 2—2 of Figure 1 looking in the direction of the arrows;

Figure 3 is a vertical sectional view of a modified form of relief valve;

Figure 4 is a vertical sectional view of another modification of the relief valve of my invention; and Figure 5 is a perspective view of an auxiliary valve opening assembly utilized in the valve of Figure 4.

Referring now to the drawings in detail and particularly to Figures 1 and 2, the relief valve includes an annular body 10 having an enlarged upper section or end 11 and a lower or reduced conduit section 12. Mounted at the inner end of conduit section 12 is a valve seat comprising a circumferential metal ridge 13. The upper end of enlarged portion 11 is threaded at 14 to receive a cap 15 having a plurality of vent openings 16.

A valve head 17 is mounted for longitudinal movement within the enlarged portion 11 of the valve body, the head including an annular block 18 which carries, at the upper end thereof, a series of circumferentially arranged guides 19 to prevent tilting of the valve head within the body. A gasket 20 is mounted within a suitable recess 21 formed in the valve head, this gasket being held within the recess by a bolt 22. The gasket and valve head are urged into engagement with the valve seat 13 by a helical coil spring 23 which is mounted, at one end thereof, about an abutment 24 protruding downwardly from the cap 15 and, at its other end, about an abutment 25 protruding upwardly from the valve head. The valve head is further provided with a series of downwardly extending circumferentially spaced guides 27 which center the valve head within the casing during the opening and closing movements of the valve head.

It will be evident that the valve is opened when the pressure in conduit 12 is sufficient to overcome the force of spring 23 and the weight of the valve head assembly, thereby permitting gases to escape through the region between the valve head and seat and, thence, through a passageway 28 defined by the valve body and valve head to the vents 16. When the pressure in conduit 12 drops, the valve is seated due to the pressure of spring 23.

In accordance with the invention, the opening and closing movements of the valve are facilitated by an auxiliary assembly 30 of novel construction. At its intermediate portion, the valve head 17 is of polygonal cross section, as indicated in Figure 2, thereby providing a series of surfaces 31 for supporting the auxiliary valve opening and closing members now to be described. These members are denoted by reference numeral 32 and they are formed from resilient spring material. Each member 32 has an upper portion 33 secured to one of the surfaces 31 by a pair of bolts 34. Further, each member has an outwardly curving intermediate portion 35 and an inwardly curving lower portion 36 depending from the upper portion 33. Due to the resilience and springiness of the metal from which the members 32 are formed, they normally assume the positions shown by full lines in Figure 1, wherein the curved lower portions 36 extend to positions closely spaced to the region of engagement of valve seat 13 and gasket 20. In fact, the lower end of these members may engage the guides 27.

When the valve is open, the gases initially escaping from conduit 12 impinge against the members 32 and cause them to swing outwardly within the passageway 28 to the dotted line positions shown by Figure 1. This outward movement increases the surface area of the members exposed to the escaping gases, and the gases, therefore, exert a force upon the members and valve head tending to move the valve to open position. This facilitates the opening movement of the valve and greatly increases the rapidity with which it is accomplished. When the pressure in conduit 12 decreases responsive to the escape of gases therefrom, the members 32 collapse due to their resiliency and return to their full line positions, as shown by Figure 1. When the gas flow decreases by a relatively slight amount, the decrease in area caused by collapse of the members 32 causes a quick reseating of the valve. It will be evident that the auxiliary assembly provides a quick opening and closing action of the valve and tends to eliminate or greatly minimize valve chattering.

In Figure 3, I have shown a modification of the auxiliary valve opening and closing assembly as applied to a valve of the same type shown by Figure 1, corresponding parts being denoted by like reference numerals in the two figures. In this figure, a flange 40 is provided upon the valve head 17, and each auxiliary valve opening and closing member 41 has a spun-over upper end portion 42 which is crimped within a recess defined by a protruding element 43 of the flange 40. Each member 41 further includes an outwardly curved upper portion 44, a generally V-shaped intermediate portion 45, and an inwardly curved lower portion 46 which extends to a position closely spaced to the region of engagement of valve head 17 with valve seat 13. In this modification also, the curved lower portion 46 of each member may engage the guides 27 formed on the valve head.

The members 41 are urged to the position shown by Figure 3 by a circular coil spring 47 which encircles the head 17 and fits within the V-shaped intermediate portion of each of the auxiliary valve opening and closing members 41.

It will be evident that the valve opening and closing members of Figure 3 function in essentially the same manner as described in connection with the members 32 of Figures 1 and 2. When the valve is opened, the pressure of the escaping gases forces the members 41 outwardly into passageway 28 and a force is exerted by the gases upon the members 41 and the valve head, tending to quickly open the valve. When the pressure in conduit 12 decreases, the members 41 collapse due to the force exerted by spring 47 and the valve is quickly seated.

In Figures 4 and 5, I have shown a modified auxiliary valve opening and closing assembly as applied to a slightly different type of relief valve. This valve includes a body 50 having a threaded cap 51 provided with vent openings 52, the casing including an enlarged portion 53 and a reduced conduit portion 54. In this modification a valve seat 55 is formed by a frusto-conical surface at the inner end of conduit section 54 and a valve head 56 has secured at the lower end thereof a gasket 57 which is engageable with the valve seat 55. In this valve, the head is guided by a collar 58 encircling a stem 59 protruding downwardly from the cap 51, a spring 60 being mounted between the cap 51 and a nut 61 threaded to the collar 58, this spring urging the valve head 56 and its associated gasket 57 into engagement with valve seat 55.

An auxiliary valve opening and closing assembly 63, Figure 5, has an upper ring-shaped support 64 which is secured between the lower portion 65 of the valve head and a washer 66 abutting the member 61. Depending from the ring-shaped support 64 are a plurality of auxiliary valve opening and closing members 67 each having a relatively thin upper portion 68 and a relatively thick lower portion 69, the lower end of which extends into an annular recess 70 formed in the enlarged body portion 53. Each depending member 67 is provided with an arcuate groove 72 within which fits a circular coil spring 73, this spring urging the lower portions 69 of the respective members 67 toward a position closely spaced to the region of engagement of the gasket 57 with valve seat 55.

In the operation of the valve of Figures 4 and 5, when the valve opens sufficiently as to allow the lower portions 69 of members 67 to move out of recess 70, the gases escaping from the conduit 54 cause the member 67 to swing outwardly into a passageway 75 between the enlarged portion of the valve body and the valve head. This outward movement increases the surface area of the members 67 exposed to the gas pressure and exerts a force on the valve head tending to quickly open the valve. The described swinging movement is accomplished about the relatively thin upper portions 68 of the members 67. When the pressure decreases, the lower portions 69 collapse inwardly due to the force exerted by spring 73, thereby reducing the secondary area of the valve and causing it to move quickly toward closed position, the lower portions 69 entering the groove 70 as the valve is closed. Thus, except for the cooperation of members 67 with groove 70, the valve operates in substantially the same manner as described in connection with Figure 3.

It will be evident that I have achieved the objects of my invention in providing a relief valve which opens and closes very rapidly and in which chattering is eliminated or greatly minimized, this improved result being effected to a larger extent by the provision of a swinging auxiliary member in the passageway through which the escaping gases pass to reach the valve vent. Further, the valve is quite sturdy in operation and little modification is required to adapt existing relief valves to provide auxiliary valve opening and closing structures according to my invention.

While the invention has been described in connection with a present, preferred embodiment thereof, it is to be understood that this description is illustrative only and is not intended to limit the invention.

I claim:

1. A relief valve comprising, in combination, a valve head, a valve body cooperating with said head to define a passageway for gases escaping from the valve, said body including a valve seat, means for urging said head into engagement with said seat, and an auxiliary valve opening assembly secured to said head comprising a member constructed and arranged to swing outwardly into said passageway under the pressure of escaping gases, said outward movement increasing the surface area of said member exposed to said gases which thereby exert a force on said member tending to further open said valve, said assembly including structure urging to a collapsed position to facilitate closing of the valve upon reduction of the pressure of said escaping gases.

2. A relief valve comprising, in combination, a valve head, a valve body cooperating with said head to define a passageway for gases escaping from the valve, said body including a valve seat, means for urging said head into engagement with said seat, and an auxiliary valve opening assembly secured to said head comprising a plurality of members of resilient material disposed about said valve head, each member having a depending portion curving inwardly toward the region of engagement of said valve head with said valve seat, whereby said curved portion is adapted to swing outwardly into said passageway under the pressure of escaping gases, said outward movement increasing the surface area of said member exposed to said gases which thereby exert a force on said member and said valve head tending to further open said valve, the curved portion of each member moving inwardly toward said region of engagement of said head and seat when the pressure of said escaping gases is reduced, thereby to faciliate closure of said valve, said returning movement being effected by the resilience of said material.

3. A relief valve comprising, in combination, a valve head, a valve body cooperating with said head to define a passageway for gases escaping from the valve, said body including a valve seat, means for urging said head into engagement with said seat, and an auxiliary valve opening assembly secured to said head comprising a plurality of members of resilient material disposed about said valve head, each member having a depending portion curving inwardly toward the region of engagement of said valve head with said valve seat, whereby said curved portion is adapted to swing outwardly into said passageway under the pressure of escaping gases, said outward movement increasing the surface area of said member exposed to said gases which thereby exert a force on said member and said valve head tending to further open said valve, the curved portion of each member moving inwardly toward said region of said engagement of said head and seat when the pressure of said escaping gases is reduced, and a spring mounted in said passageway to urge each member to a position wherein said curved portion is positioned adjacent the region of engagement of said valve head with said valve seat.

4. A relief valve comprising, in combination, a valve head, a valve body cooperating with said head to define a passageway for gases escaping from the valve, said body including a valve seat, means for urging said head into engagement with said seat, and an auxiliary valve opening assembly secured to said head comprising a plurality of members each having a relatively thin portion secured to said valve head and a relatively thick depending portion positioned adjacent the region of engagement of said valve head with said valve seat, whereby each member is adapted to swing outwardly in said passageway about said relatively thin upper portion under the pressure of gases escaping from said valve, said outward movement increasing the surface area of said member exposed to said gases which thereby exert a force on said member tending to further open said valve, and a spring urging said member toward a collapsed position wherein said depending portion is closely spaced to the region of engagement of said valve head with said valve seat.

5. A relief valve comprising, in combination, an annular valve body having an enlarged end, a conduit section of reduced diameter communicating with said enlarged end, and a valve seat formed at the inner end of said conduit section, a valve head mounted for longitudinal movement within said enlarged end, a spring urging said valve head into engagement with said valve seat, the region between said seat and said enlarged end of the valve body defining a passageway for gases escaping from the valve, and an auxiliary valve opening assembly carried by said head comprising a series of members circumferentially spaced about said head, each member having a depending portion extending to a position closely spaced to the region of engagement of said valve head and valve seat, each member being constructed and arranged to swing outwardly into said passageway under the pressure of escaping gases, said outward movement increasing the surface area of said member exposed to said gases which thereby exert a force on said member tending to further open said valve, means collapsing said member inwardly when the pressure of said escaping gases is reduced, thereby to facilitate closure of said valve.

6. A relief valve comprising, in combination, an annular valve body having an enlarged end, a conduit section of reduced diameter communicating with said enlarged end, and a valve seat formed at the inner end of said conduit section, a valve head mounted for longitudinal movement within said enlarged portion, a spring urging said valve head into engagement with said valve seat, the region between said seat and said enlarged end of the valve body defining a passageway for gases escaping from the valve, and an auxiliary valve opening assembly including a flanged portion secured to said valve head, and a plurality of members depending from said flanged portion, each member including a relatively thin upper portion and a relatively thick lower portion positioned close to the region of engagement of said valve head with said valve seat and fitting into an annular recess in the valve body adjacent said seat, each member having a circumferential groove formed therein, and a circular coil spring surrounding said valve head and fitting within said grooves to urge said members toward a collapsed position.

7. A relief valve comprising, in combination, an elongated valve body having a relatively small conduit portion and a relatively large body portion, a valve seat formed at the inner end of said conduit portion, a cap at the outer end of said body portion, said cap having openings therein to permit escape of gases from said body, a valve head movable longitudinally within the enlarged portion of the valve body, a resilient gasket carried by said valve head and adapted for engagement with said valve seat, a helical spring positioned between said cap and said valve head to urge said gasket into engagement with said valve seat, the region between said valve head and the enlarged portion of said valve body constituting a passageway for gases escaping from the valve, and an auxiliary valve opening assembly carried by said head comprising a series of members circumferentially spaced about said head, each member having a depending portion extending to a position closely spaced to the region of engagement of said valve head and valve seat, each member being constructed and arranged to swing outwardly into said passageway under the pressure of escaping gases, said outward movement increasing the surface area of said member exposed to said gases which thereby exert a force on said member tending to further open said valve, said assembly including structure urging to a collapsed position to facilitate closing of the valve upon reduction of the pressure of said escaping gases.

8. A relief valve comprising, in combination, an elongated valve body having a relatively small conduit portion and a relatively large body portion, a valve seat formed at the inner end of said conduit portion, a cap at the outer end of said body portion, said cap having openings therein to permit escape of gases from said body, a valve head movable longitudinally within the enlarged portion of the valve body, a resilient gasket carried by said valve head and adapted for engagement with said valve seat, a helical spring positioned between said cap and said valve head to urge said gasket into engagement with said valve seat, the region between said valve head and the enlarged portion of said valve body constituting a passageway for gases escaping from the valve, and an auxiliary valve opening assembly including a plurality of members of resilient material secured to and spaced circumferentially around said valve head, each member having a depending portion curving inwardly toward the region of engagement of said valve head and valve seat, said curved portion being urged to such position by the resiliency of said material, and each curved portion being adapted to swing outwardly into said passageway under the pressure of said escaping gases.

9. A relief valve comprising, in combination, an elongated valve body having a relatively small conduit portion and a relatively large body portion, a valve seat formed at the inner end of said conduit portion, a cap at the outer end of said body portion, said cap having openings therein to permit escape of gases from said body, a valve head movable longitudinally within the enlarged portion of the valve body, a resilient gasket carried by said valve head and adapted for engagement with said valve seat, a helical spring positioned between said cap and said valve head to urge said gasket into engagement with said valve seat, the region between said valve head and the enlarged portion of said valve body constituting a passageway for gases escaping from the valve, and an auxiliary valve opening assembly including a flanged portion secured to said valve head, and a plurality of members depending from said flanged portion, each member including a relatively thin upper portion and a relatively thick lower portion positioned adjacent the region of engagement of said valve head with said valve seat, an arcuate groove formed in each lower portion, and a circular coil spring surrounding said valve head and fitting within said arcuate grooves to urge said members toward a collapsed position.

10. A relief valve comprising, in combination, a valve head, a valve body cooperating with said head to define a passageway for gases escaping from the valve, said body including a valve seat, means for urging said head into engagement with said seat, an auxiliary valve opening assembly secured to said head comprising a member secured to said valve, movable relative thereto, extending into said passageway, and so positioned that the pressure of gases escaping through said passageway exerts a force on said member causing it to swing outwardly into said passageway, thereby increasing the surface area of said member exposed to said gases and tending to further open said valve, and means collapsing said member to facilitate closing of the valve upon reduction of the pressure of said gases.

11. A relief valve comprising, in combination, an annular valve body having an enlarged end, a conduit section of reduced diameter communicating with said enlarged end, and a valve seat formed at the inner end of said conduit section, a valve head mounted for longitudinal movement within said enlarged end, a spring urging said valve head into engagement with said valve seat, the region between said seat and said enlarged end of the valve body defining a passageway for gases escaping from the valve, and an auxiliary valve opening assembly carried by said head comprising a series of resilient members circumferentially spaced about said head, each member being arranged to swing outwardly into said passageway under the pressure of escaping gases, said outward movement increasing the surface area of said member exposed to said gases which thereby exert a force on said member tending to further open said valve, each member having one end thereof secured within a flanged portion of said valve head, an outwardly curving depending portion, a generally V-shaped intermediate portion, and an inwardly curving lower portion positioned adjacent the region of engagement of said valve head with said valve seat, and a circular coil spring surrounding said valve head and fitting within the V-shaped intermediate portions of said members so that when the pressure of said escaping gases is reduced, the closure of said valve is thereby facilitated.

12. A relief valve comprising, in combination, an elongated valve body having a relatively small conduit portion and a relatively large body portion, a valve seat formed at the inner end of said conduit portion, a cap at the outer end of said body portion, said cap having openings therein to permit escape of gases from said body, a valve head movable longitudinally within the enlarged portion of the valve body, a resilient gasket carried by said valve head and adapted for engagement with said valve seat, a helical spring positioned between said cap and said valve head to urge said gasket into engagement with said valve seat, the region between said valve head and the enlarged portion of said valve body constituting a passageway for gases escaping from the valve, and an auxiliary valve opening assembly carried by said head comprising a series of resilient members circumferentially spaced about said head, each member being arranged to swing outwardly into said passageway under the pressure of escaping gases, said outward movement increasing the surface area of said member exposed to said gases which thereby exert a force on said member tending to further open said valve, each member having one end thereof secured within a flanged portion of said valve head, an outwardly curving depending portion, a generally V-shaped intermediate portion, and inwardly curving lower portion positioned adjacent the region of engagement of said valve head with said valve seat, and a circular coil spring surrounding said valve head and fitting within the V-shaped intermediate portions of said members so that when the pressure of said escaping gases is reduced, the closure of said valve is thereby facilitated.

References Cited in the file of this patent

UNITED STATES PATENTS

| | | |
|---|---|---|
| 344,864 | Richardson | July 6, 1886 |
| 344,866 | Richardson | July 6, 1886 |
| 1,660,634 | Thomas | Feb. 28, 1928 |
| 2,183,650 | Klafstad | Dec. 19, 1939 |
| 2,254,209 | Buttner | Sept. 2, 1941 |

FOREIGN PATENTS

| | | |
|---|---|---|
| 22,878 | Great Britain | Nov. 12, 1901 |